(12) United States Patent
Fitzpatrick

(10) Patent No.: US 9,170,704 B2
(45) Date of Patent: Oct. 27, 2015

(54) SEQUENCING CONTENT

(75) Inventor: John James Fitzpatrick, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 304 days.

(21) Appl. No.: 13/997,782

(22) PCT Filed: Dec. 15, 2011

(86) PCT No.: PCT/US2011/065172

§ 371 (c)(1),
(2), (4) Date: Jun. 25, 2013

(87) PCT Pub. No.: WO2012/094124

PCT Pub. Date: Jul. 12, 2012

(65) Prior Publication Data

US 2013/0298026 A1 Nov. 7, 2013

Related U.S. Application Data

(60) Provisional application No. 61/429,556, filed on Jan. 4, 2011.

(51) Int. Cl.
*G06F 3/048* (2013.01)
*G11B 27/034* (2006.01)
*G11B 27/34* (2006.01)
*H04N 21/41* (2011.01)
*H04N 21/422* (2011.01)
*H04N 21/44* (2011.01)
*H04N 21/4402* (2011.01)

(52) U.S. Cl.
CPC ............. *G06F 3/048* (2013.01); *G11B 27/034* (2013.01); *G11B 27/34* (2013.01);
(Continued)

(58) Field of Classification Search
CPC ............... H04N 21/47; H04N 21/472; H04N 21/47205; H04N 21/47217; H04N 21/4126; H04N 21/44; H04N 21/42204; H04N 21/440218; G11B 27/024; G11B 27/34; G06F 3/048; G06F 3/0486; G06F 3/017; G06K 9/00765

USPC ................ 715/719, 723; 725/39, 44
See application file for complete search history.

(56) References Cited

U.S. PATENT DOCUMENTS

2002/0032019 A1 3/2002 Marks et al.
2005/0007453 A1 1/2005 Ahiska
(Continued)

FOREIGN PATENT DOCUMENTS

EP 0438299 7/1991
EP 2242057 10/2010
(Continued)

OTHER PUBLICATIONS

Lee et al., "Thin-Client Computing for Supporting the QoS of Streaming Media in Mobile Devices," Computational Science and Its Applications (ICCSA 2006), Lecture Notes in Computer Science, Springer, Berlin, DE, pp. 562-571.
(Continued)

*Primary Examiner* — Ting Lee
(74) *Attorney, Agent, or Firm* — Robert D. Shedd; Brian D. Cromarty

(57) ABSTRACT

Several implementations provide a system for sequencing, or cueing, content for presentation to an audience. One such implementation provides a low bit-rate system for use with, for example, a tablet. One particular implementation constructs a display plane including a first content source window indicating content from a first content source, and a timeline for sequencing the first content source into a presentation for a presentation device. The display plane is provided to a remote device, and command information is received from the remote device. The command information is for modifying the display plane. The display plane is modified based on the received command information. Another particular implementation receives the display plane, determines command information for modifying the display plane, and provides the command information to the remote device for modifying the display plane.

17 Claims, 7 Drawing Sheets

(51) Int. Cl.
- *H04N 21/472* (2011.01)
- *G06F 3/0486* (2013.01)
- *H04N 21/47* (2011.01)
- *G06K 9/00* (2006.01)
- *G06F 3/01* (2006.01)

(52) U.S. Cl.
CPC .... *H04N 21/4126* (2013.01); *H04N 21/42204* (2013.01); *H04N 21/44* (2013.01); *H04N 21/440218* (2013.01); *G06F 3/017* (2013.01); *G06F 3/0486* (2013.01); *G06K 9/00765* (2013.01); *H04N 21/47* (2013.01); *H04N 21/472* (2013.01); *H04N 21/47205* (2013.01); *H04N 21/47217* (2013.01)

(56) References Cited

U.S. PATENT DOCUMENTS

| | | |
|---|---|---|
| 2005/0088333 A1 | 4/2005 | Allport |
| 2008/0137756 A1 | 6/2008 | Scherlis et al. |
| 2008/0159725 A1 | 7/2008 | Onodera et al. |
| 2008/0219638 A1 | 9/2008 | Haot et al. |
| 2009/0177301 A1 | 7/2009 | Hayes |
| 2009/0287790 A1 | 11/2009 | Upton et al. |
| 2010/0232518 A1 | 9/2010 | Coleman, Sr. |
| 2010/0333032 A1 | 12/2010 | Lau et al. |

FOREIGN PATENT DOCUMENTS

| | | |
|---|---|---|
| WO | WO02087244 | 10/2002 |
| WO | WO2010071996 | 7/2010 |
| WO | WO2011008387 | 1/2011 |

OTHER PUBLICATIONS

Simoens et al., "Design and Implementation of a Hybrid Remote Display Protocol to Optimize Multimedia Experience on Thin Client Devices," Australasian Telecommunication Networks and Applications Conference, 2008 (ATNAC 2008), IEEE, Dec. 7, 2008, pp. 391-396.

Sun et al., "Video Browsing on Handheld Devices—Interface Designs for the Next Generation of Mobile Video Players," IEEE Multimedia, NY, NY, vol. 15, No. 3, Jul. 1, 2008, pp. 76-83.

SEQUENCING CONTENT

CROSS-REFERENCE TO RELATED APPLICATIONS

This application claims the benefit, under 35 U.S.C. §365 of International Application PCT/US2011/065172 filed Dec. 15, 2011 which was published in accordance with PCT Article 21(2) on Jul. 12, 2012 in English and which claims the benefit of U.S. Provisional Patent Application No. 61/429,556 filed Jan. 4, 2011.

TECHNICAL FIELD

Implementations are described that relate to content. Various particular implementations relate to sequencing video and audio content.

BACKGROUND

The video content viewing experience in the home continues to rapidly evolve as more complex and sophisticated entertainment systems with greater signal processing power become available. Such systems often utilize both broadcast and internet delivered content and, in many cases, allow multiple modes of viewing simultaneously. However, despite the advances, some additional features may be desirable.

SUMMARY

According to a general aspect, a display plane is constructed. The display plane includes a first content source window indicating content from a first content source, and a timeline for sequencing the first content source into a presentation for a presentation device. The display plane is provided to a remote device. Command information is received from the remote device in response to providing the display plane. The command information is for modifying the display plane. The display plane is modified based on the received command information.

According to another general aspect, a display plane is received. The display plane includes a first content source window indicating content from a first content source, and a timeline for sequencing the first content source into a presentation for a presentation device. Command information is determined. The command information is for modifying the display plane. The command information is provided to a remote device for modifying the display plane.

The details of one or more implementations are set forth in the accompanying drawings and the description below. Even if described in one particular manner, it should be clear that implementations may be configured or embodied in various manners. For example, an implementation may be performed as a method, or embodied as an apparatus, such as, for example, an apparatus configured to perform a set of operations or an apparatus storing instructions for performing a set of operations, or embodied in a signal. Other aspects and features will become apparent from the following detailed description considered in conjunction with the accompanying drawings and the claims.

DETAILED DESCRIPTION

As mentioned above, the video content viewing experience in the home continues to rapidly evolve as more complex and sophisticated entertainment systems with greater signal processing power become available. Such systems often utilize both broadcast and internet delivered content and, in many cases, allow multiple modes of viewing simultaneously. However, despite the advances, some additional features may be desirable.

Various implementations provide for one or more additional features. For instance, a user or operator may wish to maximize the viewing experience while hosting others, such as at an event or party. In order to accomplish this, it may be desirable to interleave content, such as another movie or highlights, during the commercial portions of a sporting event or game being viewed.

According to various implementations, a user or operator may have several options for viewing content simultaneously or sequentially. Some entertainment systems permit simultaneous viewing of more than one event on the same screen, such as a picture-in-picture display. It may be desirable to allow channel changing during commercials and to use a timer to return to the originally tuned broadcast channel after the timer has timed out. The inventors have identified the usefulness of a mechanism for enabling the user to process, alter, and order the content in such a way as to perform a sequenced presentation of multiple content elements to the viewing audience without the audience viewing the content sequencing. Various types of alterations include, for example, mosaic blocking, audio muting, scene skipping, and/or audio substituting.

Various embodiments described in the present disclosure are related to a method and apparatus for cueing content for display on a video display system. Several of these embodiments include a second device, such as, for example, a remote processing tablet, allowing a pre-viewing and sequencing of content prior to display on the video display. Live content may be time delayed using a storage medium, such as, for example, a hard drive, in order to allow for cueing. Content from multiple additional sources may be interleaved into a main display as edited by a user. Certain of these embodiments also enable the use of pointers into time delayed live content of user pre-recorded content. The host display plane is constructed in a main processing device, such as a set top box ("STB"), so that, in at least one implementation, only the changing graphics are sent digitally to the cuing tablet. Hand gestures are used in several implementations to cue content. These hand gestures are digitized and sent to the master video processing system to enable processing of the sequence.

Figure 1:
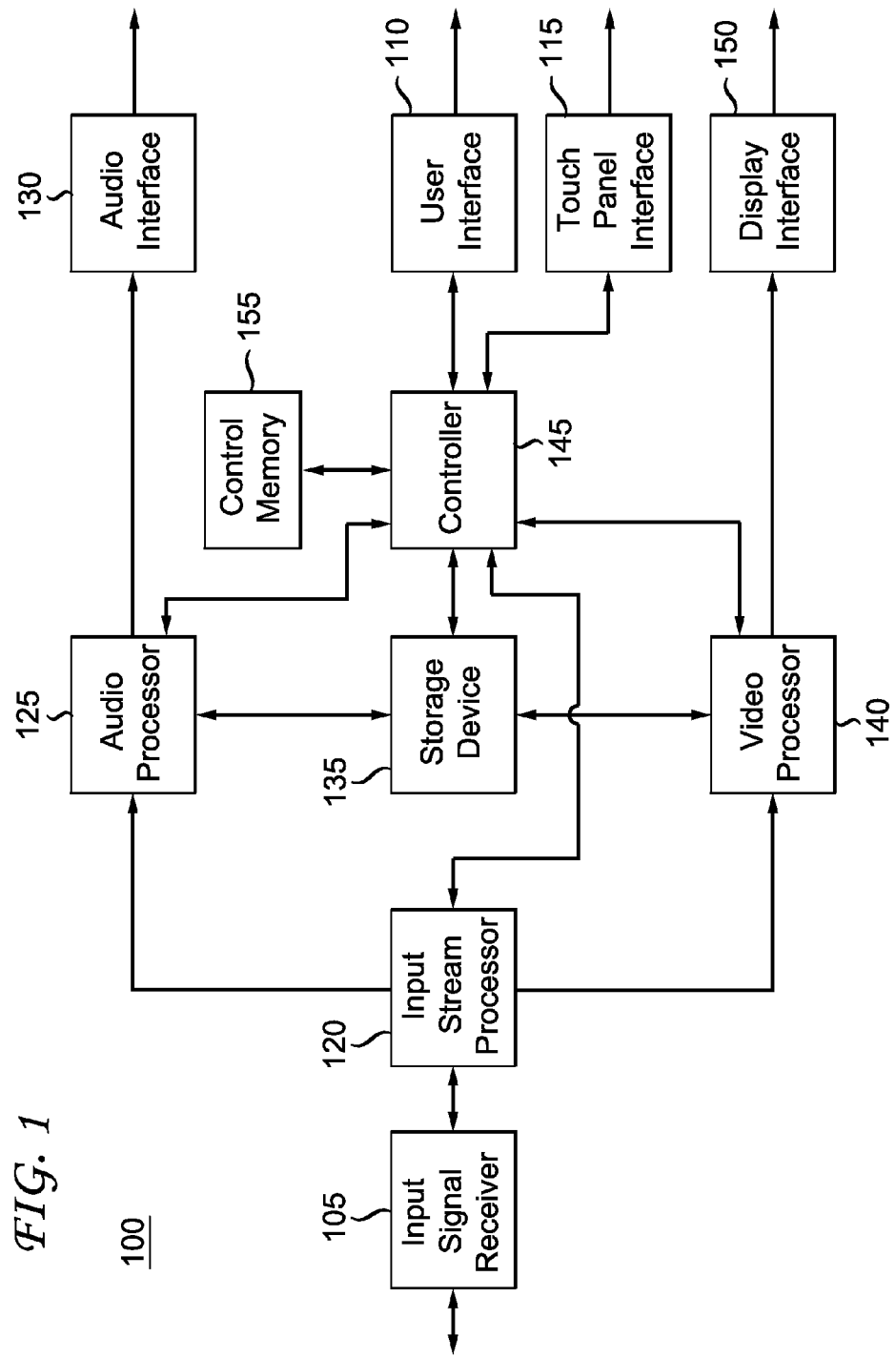
FIG. 1 is a block/flow diagram depicting an implementation of a communications device and a communications process.

Turning now to FIG. 1, a block diagram 100 of a particular embodiment of a receiving device is shown. The receiving device 100 is included, in various implementations, for example, as part of a gateway device, modem, settop box, or other similar communications device. The device shown is also incorporated, in various implementations, into other systems including, for example, an audio device or a display device. In any case, several components necessary for complete operation of the system are not shown in the interest of conciseness, as they are well known to those skilled in the art.

In the device shown in FIG. 1, the content is received by an input signal receiver 105. The input signal receiver 105 is, in various implementations, for example, one of several known receiver circuits used for receiving, demodulation, and decoding signals provided over one of several possible networks. Possible networks include, for example, over the air, cable, satellite, Ethernet, fiber, and phone line networks. The desired input signal is, in the implementation shown, selected and retrieved by the input signal receiver 105 based on user input provided through a control interface 110 or a touch panel interface 115 (the control interface 110 and the touch panel interface 115 are the same interface in various implementations). The touch panel interface 115 includes an interface for a touch screen device (not shown in FIG. 1). The touch panel interface 115 is adapted, in various implementations, to interface to a cellular phone, a tablet, a mouse, a high end remote control device, or similar devices.

The decoded output signal from the input signal receiver 105 is provided to an input stream processor 120. The input stream processor 120 performs the final signal selection and processing, which includes separation of video content from audio content for the content stream that is part of the decoded output signal. The audio content is provided to an audio processor 125 as an audio signal. The audio processor 125 performs conversion from the received format of the audio signal, such as from a compressed digital signal to an analog waveform signal. The analog waveform signal is provided to an audio interface 130 and further to a display device (not shown in FIG. 1) or to an audio amplifier (not shown in FIG. 1). Alternatively, in another implementation, the audio interface 130 provides a digital signal to an audio output device or display device using a High-Definition Multimedia Interface (HDMI) cable or alternate audio interface such as via a Sony/Philips Digital Interconnect Format (SPDIF). The audio interface 130 also includes, in other implementations, amplifiers for driving one more sets of speakers. The audio processor 125 also performs conversion, if needed, for the storage of the audio signals in a storage device 135.

The video content is output from the input stream processor 120 as a video signal. The video signal is provided to a video processor 140. The video signal may be one of several formats. The video processor 140 provides, if needed, a conversion of the video content, based on the input signal format of the video signal. For example, in various implementations, the video signal is converted from a compressed digital signal to an analog waveform signal. The video processor 140 also performs conversion, if needed, for the storage of the video signal in the storage device 135.

The storage device 135 stores audio and video content received at the input. The storage device 135 allows later retrieval and playback of the content under the control of a controller 145 and also based on commands. Such commands include, for example, navigation instructions such as fast-forward (FF) and rewind (Rew) received from the user interface 110 and/or the touch panel interface 115. The storage device 135 includes, in various implementations, for example, (i) a hard disk drive, (ii) one or more large capacity integrated electronic memories, such as, for example, static RAM (SRAM) or dynamic RAM (DRAM), or (iii) an interchangeable optical disk storage system such as a compact disk (CD) drive or digital video disk (DVD) drive.

The converted video signal provided as output from the video processor 140, and originating either from the input stream processor 120 or from the storage device 135, is provided to a display interface 150. The display interface 150 further provides a display signal to a display device (not shown in FIG. 1), such as a television, a computer, and/or a display monitor. The display interface 150 is, in various implementations, an analog signal interface such as, for example, an interface that provides an analog red-green-blue ("RGB") signal at appropriate levels to an analog RGB display. In other implementations, the display interface 150 is a digital interface such as, for example, an interface that provides a digital signal in HDMI format to an HDMI display.

The controller 145 is interconnected via a bus to several of the components of the receiving device 100, including the input stream processor 120, the audio processor 125, the video processor 140, the storage device 135, and a user interface such as, for example, the user interface 110 and/or the touch panel interface 115. In the implementation of FIG. 1, the controller 145 manages the conversion process for converting the output signals from the input stream processor 120 into signals for storage on the storage device 135, for playback on, for example, a display device and/or an audio reproduction device. The controller 145 of the receiving device 100 also manages the retrieval and playback of stored content from the storage device 135.

The controller 145 is further coupled to a control memory 155. The control memory 155 includes, in various implementations, volatile or non-volatile memory, including RAM, SRAM, DRAM, ROM, programmable ROM (PROM), flash memory, electronically programmable ROM (EPROM), and/or electronically erasable programmable ROM (EEPROM). The control memory 155 is for storing information and instruction code for the controller 145. The control memory 155 stores, in various implementations, instructions executed by the controller 145 in operating the receiving device 100 and/or one or more other devices. Such other devices include, in various implementations, for example, a main device (for example, a gateway, a set-top box, or a modem) that includes the receiving device 100, and/or another device contained within or communicating with the main device.

The information and instruction code, including, for example, software components and software interfaces, stored on the control memory 155 and used for operation, is executed by the controller 145 in typical implementations. Additionally, in various implementations, some operations are transferred, by communication of all or part of the stored information and instruction code over a communications interface, and executed by an external device. Such external devices include, in various implementations, for example, a touch panel device as described below for example.

The control memory 155 also stores, in certain implementations, a database of elements, such as, for example, graphic elements containing content. Further, the implementation of the control memory 155 is achieved, in various embodiments, in a single memory device, or, alternatively, in more than one memory circuit communicatively connected or coupled together to form a shared or common memory. Still further, in certain implementations, the control memory 155 is included with other circuitry, such as, for example, portions of bus communications circuitry in a larger circuit.

In various implementations, several of the components of the receiving device 100 are included as part of a video processing unit. In at least one such implementation, the input stream processor 120, the video processor 140, the storage device 135, and the controller 145 are included as part of the video processing unit. The functionality of a video processing unit, according to at least one implementation, is described in further detail below.

The user interface process of various implementations uses an input device that can be used to express functions, such as, for example, fast forward, rewind, etc. To allow for this, a touch panel device, such as, for example, a remote tablet, is interfaced via the user interface 110 and/or the touch panel interface 115 of the receiving device 100, as shown in FIG. 1. One such touch panel device is shown in FIG. 2.

Figure 2:
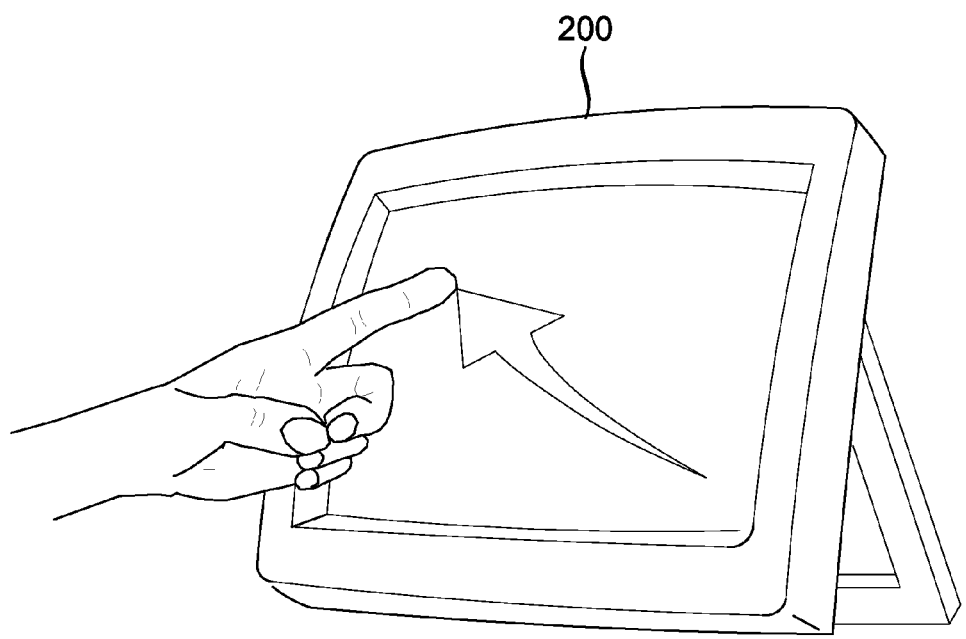
FIG. 2 is a pictorial representation of an implementation of an input/output device and an input/output process.

Referring to FIG. 2, a touch panel device 200 is shown. The touch panel device 200 allows operation, for example, of the receiving device 100 or the main device that includes the receiving device 100 (for example, a set top box). The touch panel device 200 allows for such operation based on, for example, hand movements and actions translated through the touch panel device 200 into commands for the receiving device 100, the set top box, or other control device.

In various implementations, gestures are used to provide input, and in particular, finger gestures are used. Finger gestures typically provide input on variables such as, for example, (i) initial location(s) at which one or more fingers initially touch a touch screen (referred to as, for example, a point of contact of the gesture, or as the coordinates of the gesture), (ii) a duration for which each of the one or more fingers remains at the initial location (referred to as, for example, a duration of contact of the gesture), (iii) a direction in which each of the one or more fingers is moved across the touch screen (referred to as, for example, a direction of movement of the gesture), (iv) intermediate and final location(s) of each of the one or more fingers during the movement of the one or more fingers across the touch screen, and/or (v) a speed of the movement of each of the one or more fingers across the touch screen (referred to as, for example, a speed of movement of the gesture). Note that a velocity of the gesture refers to a combination of the speed of movement of the gesture and the direction of movement of the gesture.

In one embodiment, the touch panel device 200 simply serves as a navigational tool to navigate within the display. In another embodiment, the touch panel device 200 additionally serves as the display device allowing the user to more directly interact with the navigation through the display of content.

The touch panel device 200 is integrated, in one implementation, into the set-top box itself as part of, for instance, a front panel display or array. In another implementation, the touch panel device 200 is (alternatively, or additionally) included as part of a remote control device containing more conventional control functions such as activator buttons.

Figure 3:
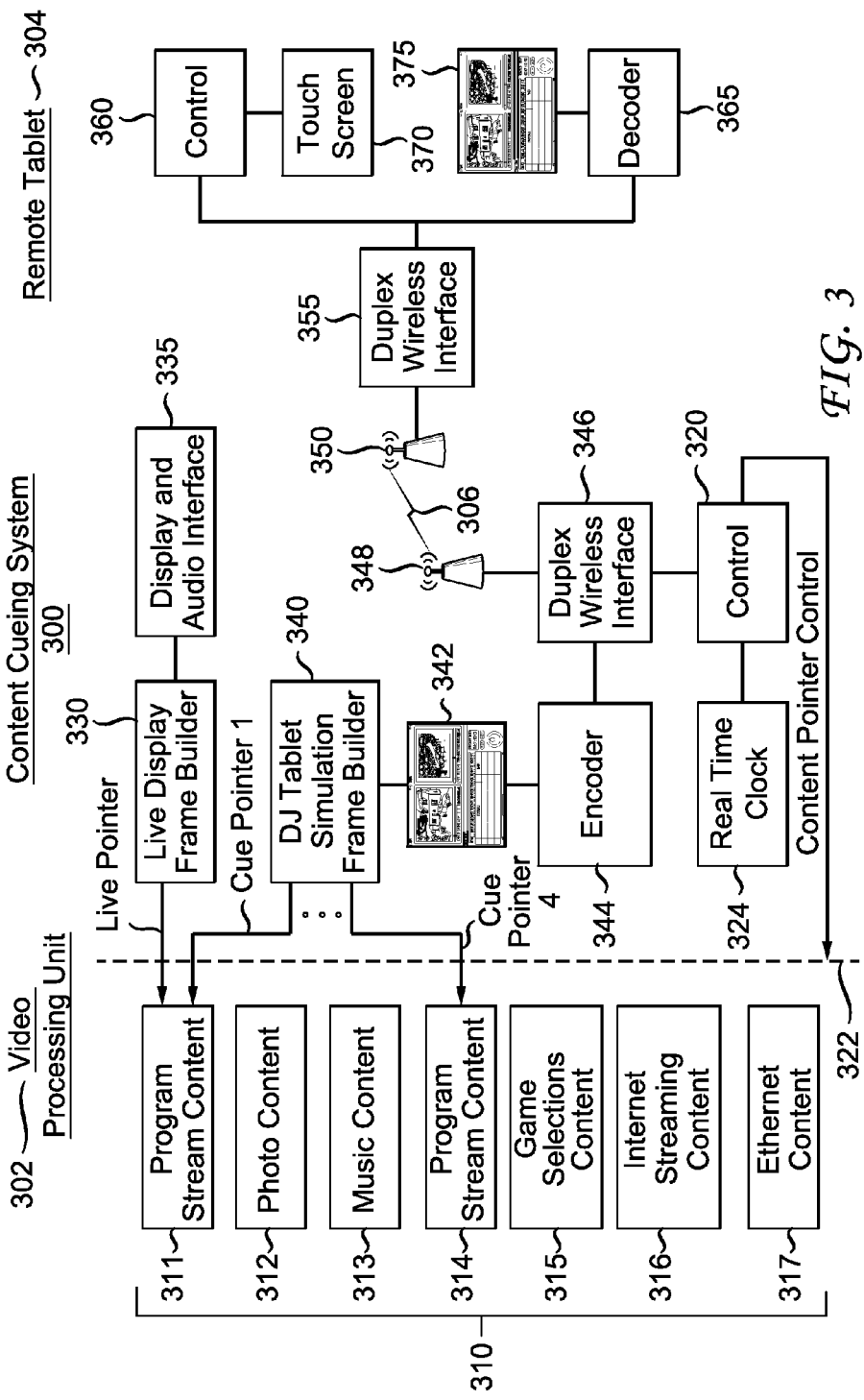
FIG. 3 is a block/flow diagram depicting an implementation of a system and process for content cueing.

Referring to FIG. 3, there is shown an embodiment of a system 300 for processing and cueing video content for display and viewing. The system 300 of FIG. 3 illustrates a combination of both software and hardware components. The system 300 includes a video processing unit 302 and a remote tablet 304.

FIG. 3 also shows a communications medium 306 through which the video processing unit 302 communicates with the remote tablet 304. The communications medium 306 is, strictly speaking, not part of the system 300.

FIG. 3 further shows a series of content options 310 at the input to the video processing unit 302. The content options 310 provide examples, and are not intended to be limiting or exhaustive, nor required. The content options 310 are shown as input to, and part of, the video processing unit 302. Accordingly, the content options 310 are stored, at least temporarily, within the video processing unit 302. However, in typical implementations, the video processing unit 302 accesses at least some of the content options 310 from sources that are external to the video processing unit 302. The content options 310 include a first program stream content 311, a photo content 312, a music content 313, a second program stream content 314, a game selections content 315, an Internet streaming content 316, and an Ethernet content 317.

The hardware components included in the video processing unit 302 are, in at least one implementation, included in a receiving device, such as, for example, the receiving device 100 described in FIG. 1, and are further included in a set-top box, gateway device, or television display device. The software components included in the video processing unit 302 are, in at least one implementation, stored in a memory in the receiving device or similar device and are executed by a controller or microprocessor in the same device.

The hardware components in the remote tablet 304 are, in at least one implementation, included in a touch screen display or tablet, such as, for example, the touch panel device 200 described in FIG. 2. It is important to note that the main software elements of the system are intended to be stored and executed within the main video processing unit leaving primarily a signal interface to the remote tablet functions. That is, the remote tablet, in various implementations does not perform many functions. Rather, most of the functions of the system are performed by main video processing unit.

In FIG. 3, the content 310 is present in the video processing unit 302 in various forms, such as, for example, recorded program streams 311 and 314, music content 313, and/or live streams from the Internet 316. The video processing unit 302 further includes a control block 320. The control block 320 of the video processing unit 302 has control of the pointers into the content 310.

Figure 4:
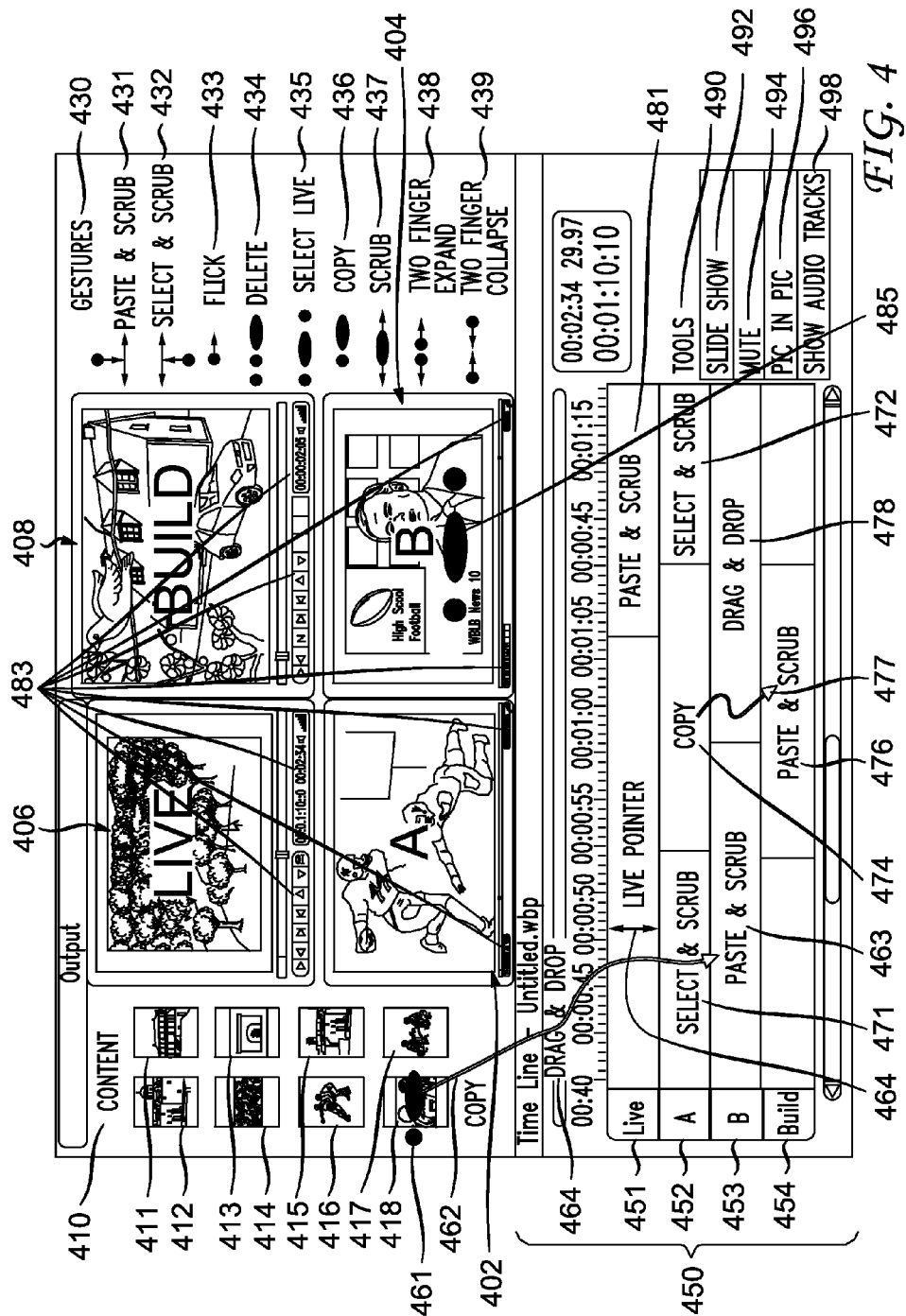
FIG. 4 is a pictorial representation of an implementation of a display plane and a process for sequencing content.

The pointers include the live pointer and one or more cue pointers. In the system 300, there are four cue pointers and FIG. 4 shows a first cue pointer referred to as cue pointer 1, and a fourth cue pointer referred to as cue pointer 4. The live pointer is used to read and display the content intended for immediate display or presentation to a viewing audience. The cue pointers point into content that makes up the frame pictured in the simulation below in FIG. 4. The video processing unit 302 includes a pointer control line 322. The pointer control line 322 is controlled by the control block 320 and controls the various pointers used in the video processing unit 302. Each of these pointers, and the control of the pointers, will be further described below.

The video processing unit 302 further includes a real time clock 324 coupled to the control block 320. The real time clock 324 is used to synchronize events, as later described.

The video processing unit 302 additionally includes a live display frame builder 330 and a display and audio interface 335. The live display frame builder 330 constructs the frames for display to a viewing audience and provides these frames, and associated audio, to the display and audio interface 335. The display and audio interface 335 provides the output video and audio to a presentation device (not shown) such as, for example, a television or a computer. The live display frame builder 330 uses the live pointer to locate the content that is to be presented to the audience.

The video processing unit 302 further includes a disc jockey ("DJ") simulation frame builder 340. The tablet simulation frame builder 340 creates a cueing frame that allows a user to cue, or sequence, the various available content sources. The user is thus able to construct the presentation timeline for the live display that is built by the live display frame builder 330. The tablet simulation frame builder 340 uses the four cue pointers to build the cueing frame. The four cue pointers are adjustable by the user of the remote tablet 304, as explained below.

A particular implementation of the tablet simulation frame builder 340 will be described with reference to FIG. 4 (FIG. 4 is explained in more detail elsewhere in this application). The implementation of the tablet simulation frame builder 340 uses audio and video pointers (referred to as media pointers, more generally) into various streams or files of content. These pointers are pointing to, for example, program titles and/or media time stamps. In certain implementations, a media pointer includes a media title and either a program counter or a program time stamp reference. More generally, a media pointer typically includes a media source indicator and an identifier of a location in the media source.

These pointers typically define content, and/or frames of video/audio content. The video content is transcoded to a smaller frame resolution and size. The transcoded content is assembled into a composite image that typically includes time lines and other images and control icons as depicted in FIG. 4. This composite image, also referred to as a control frame, and/or a sequence of composite images (control frames) is encoded at a lower bit rate and digitally sent to the remote tablet 304.

As an example, a particular composite image or control frame (also referred to as a display plane) consists of a 720× 480 block of pixels as depicted in FIG. 4. The gesture table (see 430) and other static portions of FIG. 4 are part of a stored unchanging pixel map into which various changing images (see 402, 404, 406, and 408) are added. The image portions (see 402, 404, 406, and 408) of the display plane are made of images from specific stream locations or static media. Each of these images (see 402, 404, 406, and 408) is created from, for example, a 720×480 block of pixels that is transcoded to an image size of, for example, 180×120 pixels in order to fit into the appropriate display plane window (see 402, 404, 406, and 408). The video processing unit 302 constructs various timelines from user-provided gesture commands.

The static portions, the image windows (see 402, 404, 406, and 408), and the various time lines are assembled by the video processing unit 302 into the composite image. The video processing unit 302 also constructs a resulting sequence of media for presentation to a user according to the various timelines.

This composite display plane is then, in at least one implementation, MPEG encoded and sent electronically to the remote tablet 304. Therefore, in such implementations, the only data transfer from the video processing unit 302 to the remote tablet 304 is the reduced bit rate and reduced frame rate video/audio data sequence. In turn, digitally encoded gestures and button presses from the remote tablet 304 are digitally sent to the video processing unit 302 to further define control.

The cueing frame, or sequencing frame, is also referred to as a display plane. FIG. 3 includes a display plane 342 showing one example of a display plane.

Referring to FIG. 4, another example of a display plane is provided. FIG. 4 includes a display plane 400 that includes four content windows: a window 402 for a first content source A, a window 404 for a second content source B, a window 406 for a live content source, and a window 408 for a build content source. The window 402 displays content pointed to by, for example, the first cue pointer. The window 404 displays content pointed to by, for example, a second cue pointer. The window 406 displays content pointed to by, for example, a third cue pointer which points into the live sequence. The window 408 displays content pointed to by, for example, the fourth cue pointer which points into the sequence being built by a user. These four cue pointers are as shown in FIG. 3, and are used by the tablet simulation frame builder 340.

Note that the cue pointer for the live content (for example, the third cue pointer identified above) points into the sequence that will be, or has been, shown to the audience using the live display frame builder 330. In contrast, the cue pointer for the build sequence (for example, the fourth cue pointer identified above) points into the sequence that is being built. A build sequence may be copied into the live sequence, as further explained below. Accordingly, in many implementations, the live sequence is a previous version of the build sequence.

Thus, as is common in the art, a user may construct a build sequence that provides the content for the next five minutes (minutes one through five) using various content, and copy that build sequence into the live sequence. Then, the video processing unit 302 will proceed to play, during minutes one through five, the sequence that was built. Meanwhile, the user may continue to build a new "build sequence" that provides the content for the following ten minutes (minutes six through fifteen). The user may then copy that new build sequence (minutes six through fifteen) into the live sequence. The video processing unit 302 will then proceed to play the new build sequence (during minutes six through fifteen) after playing the "old" build sequence (during minutes one through five).

Note also that the live pointer and the cue pointer for the live content both point into the live content. However, the live pointer is determined by the current state of the presentation to the audience. In contrast, the cue pointer into the live content is determined by a user interacting with the display plane, and wanting to see, for example, a future portion of the live sequence.

A further discussion of the display plane 400 is provided further below. That discussion occurs in the context of the discussion of the remote table 304.

Referring again to FIG. 3, the video processing unit 302 includes an encoder 344. The encoder 344 encodes the display plane using, for example, hyper-text markup language ("HTML") or MPEG encoding or both. One implementation in particular uses version 5 of HTML. The encoder 344 is, for example, an HTML5 wrapper, an MPEG encoder, or another encoding method designed for data compression.

The video processing unit 302 also includes a duplex wireless interface 346, or some other communication mechanism, and an antenna 348. The duplex wireless interface 346 transmits the encoded display plane, through the antenna 348, over the communications medium 306.

The remote tablet includes an antenna 350 and a duplex wireless interface 355, or other communications mechanism. The duplex wireless interface 355 of the remote tablet 304 is, in various implementations, the same as the duplex wireless interface 346 of the video processing unit 302. However, in other implementations, the duplex wireless interface 355 is different from the duplex wireless interface 346.

In operation, typical implementations of the remote tablet 304 receive the transmitted display plane over the antenna 350 and the duplex wireless interface 355. The remote tablet 304 further includes a control block 360 and a decoder 365. The duplex wireless interface 355 provides the received display plane to both the control block 360 and the decoder 365. However, other implementations omit the connection between the control block 360 and the duplex wireless interface 355.

The remote tablet 304 also includes a touch screen 370 which is capable of, and configured for, displaying a decoded display plane 375. The decoder 365 produces the decoded display plane 375 and provides it to the touch screen 370 for presentation to a user. The control block 360 is communicatively coupled to the touch screen 370 to receive and resolve hand gestures or other input from the user, as explained for at least one implementation further below.

Referring again to FIG. 4, the four windows 402-408 were discussed above. The display plane 400 further includes a content selection section 410, a gesture key 430, a timeline section 450, and a tools section 490.

The content selection section 410 includes thumbnail sketches of various pieces of content that can, for example, be accessed and integrated into a build sequence. FIG. 4 shows eight content items 411-418, and more are possible by, for example, scrolling.

The gesture key 430 identifies various gestures that can be used to manipulate content. FIG. 4 shows nine gestures, including a paste and scrub gesture 431, a select and scrub gesture 432, a flick gesture 433, a delete gesture 434, a select live gesture 435, a copy gesture 436, a scrub gesture 437, a two finger expand gesture 438, and a two finger collapse gesture 439. These gestures will be described further below.

The timeline section 450 includes a live sequence timeline 451, an A source timeline 452, a B source timeline 453, and a build sequence timeline 454. FIG. 4 shows an example of the use of gestures to perform content cueing with the timelines 451-454.

The host user that is operating the remote tablet 304 may use hand gestures on the remote tablet to indicate what operation to perform. Operations may include, for example: (i) review frame sequence, (ii) select, copy, and paste a sequence from one time line to another, (iii) select and delete a sequence from a timeline, (iv) select and copy only the audio portion of a sequence from one timeline to another. These gestures are digitally interpreted and sent from the remote tablet 304 back to the video processing unit 302 where the gestures are used to create the sequence for the remote tablet 304 as well as to change the live media pointer position. As noted above, the real time clock 324 is used to synchronize events.

The gestures 431-439 shown in the gesture key section 430 of the display plane 400 will now be described. The gestures 431-439 are composed of one or more basic operations, including, for example:
 (i) A short tap with a finger on the touch screen. The short tap is referred to as a "dot", and is represented by a circle in the gesture key 430 and elsewhere in the display plane 400.
 (ii) A long tap with a finger on the touch screen, with a long tap being a tap in which the finger resides on the touch screen longer than for a short tap. The long tap is referred to as a "dash", and is represented by a long horizontal oval in the gesture key 430 and elsewhere in the display plane 400.
 (iii) Finger movement on the touch screen after a "dot" or "dash". These are represented by thin lines with an arrowhead in the gesture key 430. The direction of the arrowhead indicates the direction of the finger movement. The movements can typically in one or more of a number of different directions.

Each of the gestures shown in the gesture key 430 are now described, with reference to the above basic operations:
 (i) Scrub: Scrubbing refers, generally, to scrolling or otherwise moving through a piece of content. Scrubbing provides, for example, a user with a mechanism for viewing or manually searching through content. A scrub is initiated by a long tap, and then, without lifting the finger, moving the finger in a direction of the desired scrolling.
 (ii) Paste & Scrub: The user "short taps" an area in which the user wishes to paste previously copied content. The user then, without lifting the finger, moves the finger downward a short distance to indicate that the gesture is for a paste and scrub. The user then, without lifting the finger, moves the finger left or right to indicate the desired area of the paste. For example, the user taps a portion of the build sequence timeline 454 because the user wishes to paste content into the build sequence timeline 454. The user then moves the finger down, and then moves the finger left or right to indicate the location of the desired paste in the build sequence timeline 454. When the desired paste location is found, then the user lifts the finger and the content is pasted This left/right movement of the user's finger is referred to as the "scrub" portion of this gesture. In many applications, a user frequently scrubs, for example, a piece of content that is in a timeline. During such a scrub, the user's finger traverses across different points on the timeline. During this traverse, the window for that timeline typically displays the video for the piece of content. The displayed video moves (forward or reverse) to correspond to the point in time that the user's finger is pointing to at any given moment.

The previously copied content has a fixed duration typically. Therefore, in various implementations, the user identifies only the beginning location (or in alternate implementations, the ending location) of the paste. Additionally, paste commands are, in various implementations, executed either as inserts or as overwrites, or allow the user to specify whether the paste is an insert or an overwrite.

Paste commands are implemented in various ways in different implementations. For example, in certain implementations, selected content is pasted by dragging it to a desired location using a "drag" gesture. A drag gesture is performed, in various implementations, by a short tap, followed by moving the finger to the desired location.

The pasted content can be a variety of different items. For example, the pasted content is, in various applications, one of the content thumbnails 411-418, a section of one of the timelines 451-454, or an entire timeline.
 (iii) Select & Scrub: The user "short taps" an area in which the user wishes to select content. The user then, without lifting the finger, moves the finger upward a short distance to indicate that the gesture is for a select and scrub. The user then, without lifting the finger, moves the finger left or right to indicate one endpoint of the content that the user wants to select. For example, the user taps a portion of the A source timeline 452 because the user wishes to select content in the A source timeline 452. The user then moves the finger up, and then moves the finger left or right to indicate a first endpoint of the content that the user wants to select in the A source timeline 452. Selecting the first endpoint is referred to as punching-in, or as a punch-in.

After selecting one endpoint, the user selects the second endpoint. Selecting the second endpoint is referred to as punching-out, or as a punch-out. To select the second endpoint, the user lifts the finger after selecting the first endpoint, and short taps the same content area again, and scrubs (moves left or right) to find the desired second endpoint, and lifts the finger. After the second endpoint is selected, the piece of content has been selected. In many applications, the selected content changes appearance in some fashion, such as, for example, by changing color.

The user will generally perform another gesture after performing a "select and scrub". For example, a "paste and scrub" gesture, a "flick" gesture, a "delete" gesture, or a "copy" gesture, is often performed after a "select and scrub" gesture.

The selected content can be a variety of different items. For example, the selected content is, in various applications, one of the content thumbnails 411-418, a section of one of the timelines 451-454, or an entire timeline.

The select and scrub gesture provides, therefore, and as an example, a mechanism for setting the beginning and end points of a sequence for either deleting, copying, or moving. The scrub allows the moving back and forth within the content to pinpoint the proper selection position. The selection point content is, in various implementations, displayed in a viewing window such as, for example, one of the windows 402-408.

- (iv) Flick: The user "short taps" on a piece of content. The user then, without lifting the finger, moves the finger in one direction. The direction indicates the direction in which the user wishes to move the piece of content. The initial speed of the moved content is determined by the speed of the finger before release. The content appears to have momentum and slows in speed in response to simulated resistance. In one application, the user flicks a selected piece of content toward the right to move it later in time in the timeline. In another application, the user flicks one of the content thumbnails 411-418 into one of the windows 402-408. In another application, the user flicks one of the content thumbnails 411-418 onto one of the timelines 451-454. In many applications, the speed of the movement (the speed of the flick) indicates the distance that the flicked item is moved.
- (v) Delete: The user determines that an item should be deleted. The user then performs, in rapid succession, two "short taps" and one "long tap" at the same location in the item. The deleted item/content can be a variety of different items. For example, the deleted content is, in various applications, one of the content thumbnails 411-418, a section of one of the timelines 402-408, or an entire timeline. A delete is often performed after performing a "select and scrub" gesture.

In various implementations, the delete operation has a different impact on a timeline. In certain implementations, after deleting a selected section of a timeline, the content to the right (later in time) is automatically moved to the left (back in time) to replace the deleted content. This is much like removing a block from a stack of blocks, in which all the higher blocks shift down to fill the hole created by the removed block. In other implementations, the deleted section of the timeline is simply overwritten with black. In these implementations, a "move" gesture is typically provided, to allow a user to select and move the content from the left (or right) of the deleted section, and move that side of the timeline to fill the hole.

- (vi) Select Live: The user determines that the live timeline should be changed to another content source. The user short taps the content, then long taps the content, then short taps the content again. This is referred to as performing a dot, dash, dot in the content. A user is able, in various implementations, to perform a "select live" gesture on a variety of items, including, for example, one of the content thumbnails 411-418, one of the windows 402-408, or one of the timelines 451-454.

A "select live" gesture provides a quick mechanism for the user (the host) to modify content for the audience. In one scenario, the audience is watching a football game and the user has pulled a home video into the A source timeline 452. The user notices that a commercial has started during the football game, and performs a "select live" on the A source timeline 452. The user also pulls the football game into the B source timeline 453 (in an alternate implementation, the remote tablet 304 system software is configured to perform this operation automatically), and the football game is being displayed, therefore, on the window 404 for the content source B. When the user notices, on the window 404, that the commercial is over and the football game has resumed, then the user performs a "select live" on the window 404.

- (vii) Copy: The user determines that an item should be copied. The user may copy the content in order to perform another gesture afterward, such as, for example, pasting the copied content at another location, deleting the content, or flicking the content. To copy the content, the user performs, in rapid succession, a "short tap" and a "long tap" at the same location in the item. In many applications, the copied content changes appearance in some fashion, such as, for example, by changing color.
- (viii) Two Finger Expand: The user determines that an item should be expanded. For example, the user determines that the time scale on the build sequence timeline 454 is too compressed. The user holds the two fingers close together and places the two fingers simultaneously on the timeline at the point to be expanded. The user then simultaneously moves the two fingers away from each other in the direction of the desired expansion.
- (ix) Two Finger Collapse The user determines that an item should be collapsed. For example, the user determines that the time scale on the build sequence timeline 454 should be compressed. The user uses two fingers simultaneously to perform this gesture. The user places the two fingers spaced apart from each other simultaneously on the timeline at the region to be collapsed. The user then simultaneously moves the two fingers toward each other.

The above described gestures are illustrative only, and are not intended to be exhaustive. Various implementations use only a portion of the above gestures, and/or use additional gestures. For example, certain implementations include gestures for one or more of the following: (i) to select a particular window, (ii) to select the time shown in a particular window, (iii) to select the window for which the audio will be played at the remote tablet 304, or (iv) to play (forward or reverse) at a normal rate or some multiple of real time, to pause, to skip to end, to skip to beginning, or other common commands for a particular window. Additionally, other implementations includes gestures that involve more than two fingers and/or involve other movements.

Further, other gestures are defined with respect to buttons or other graphics in the display plane. For example, the display plane 400 includes a graphics bar 483 in each of the windows 402-408. The graphics bar 483 is expanded in the windows 406 and 408, and collapsed in the windows 402 and 404. The graphics bar 483 includes buttons for numerous common commands, including play forward, play reverse, play forward fast, play reverse fast, volume increase, volume decrease, and volume mute. The graphics bar 483 also includes information symbols to indicate program time and a frame rate indicator. By performing a short tap, for example, on one of the buttons, the user can command the video processing unit 302.

The control block 360 monitors the touch screen 370 to receive gestures from the user. When the touch screen 370 is touched, the control block 360 parses the touch to determine the location of the gesture and which gesture was performed.

After a gesture is determined, the control block 360 determines a gesture identifier and a gesture location and encodes both the gesture identifier and the gesture location.

The control block 360 determines a gesture, in certain implementations, by identifying the basic operations of the gesture in the order they are performed. The control block 360 then determines the gesture by matching these operations against the operations of the available defined gestures. After the gesture is determined, the gesture is, in certain implementations, associated with a gesture number. The gesture number is, in certain implementations, the gesture identifier. In other implementations, the gesture number is used as an index into a table to determine a bit sequence that is used as the gesture identifier. In certain implementations, the table lookup provides either a constant bit-rate or a variable bit-rate bit sequence for each gesture number. In an implementation in which there are between eight and sixteen gestures, a simple constant bit-rate code would allocate four bits to each gesture.

The gesture location refers to the location on the touch screen 370 where the gesture was received. Typical implementations provide an (x, y) coordinate of the gesture location. Certain gestures require more than a single (x, y) coordinate, however. For example, if a finger movement is detected then the control block 360 also determines an indication of the extent and, if needed, the speed, of the finger movement. This location information can be represented in several known manners. In various alternate implementations, gestures are communicated using a gyroscopic transducer, such as, for example, a gyroscopic mouse transducer, or using a motion sensing accelerometer device.

The encoded information is provided by the control block 360 to the duplex wireless interface 355. The duplex wireless interface 355 transmits the encoded gesture information, using the antenna 350, to the video processing unit 302.

As can be seen, many implementations of the remote tablet 304 provide low data-rate, also referred to as low-bandwidth, communications from the remote tablet 304 to the video processing unit 302. For example, the data rate required to send a gesture identifier and a gesture location is, in many implementations, quite small.

Referring again to FIG. 4, the tools section 490 includes several examples of tools. The examples include the following.

- A slide show tool, activated by a slide show button 492. The slide show tool is used for building a slide show and, for example, adding music or user narrated audio.
- A mute tool, activated by a mute button 494. The mute tool is a convenient way for the user to mute, for example, the system audio.
- A picture-in-a-picture ("PIP") tool, activated by a pic-in-pic button 496. The PIP tool is for displaying, for example, two or more of the remote tablet windows 402, 404, 406, and 408 on the main display monitor for the viewing audience in a PIP fashion.
- A "show audio tracks" tool, activated by a "show audio tracks" button 498. The "show audio tracks" tool is used, for example, to overlay audio tracks over the displayed video timeline, and/or to display the audio tracks alongside the video timeline.

Referring still to FIG. 4, several user cueing (sequencing) operations are indicated. Three sequencing operations will now be described.

In a first user sequencing operation, a copy gesture 461 (the "dot dash") is shown superimposed over the content item 418. This indicates a user action, and is not part of the display plane 400. The user performs the copy gesture 461, at the location indicated by the copy gesture 461, to copy the content item 418. The copied content item 418 is then pasted in the B source timeline 453 using the paste and scrub gesture 431 as indicated by a paste and scrub notation 462 in the B source timeline 453.

FIG. 4 also shows a movement line 463 that serves two purposes. The first purpose is to indicate that the copied content item 418 is the content that is pasted using the paste and scrub notation 462. The second purpose is to illustrate another implementation for pasting the content using a drag-and-drop operation. The drag-and-drop operation is further indicated a drag-and-drop notation 464. The user presumably previews the content 418 on the B source timeline 453. Note that the drag-and-drop operation is not displayed in the gesture key 430.

In a second user sequencing operation, the user has already selected certain content and inserted it (not shown) into the A source timeline 452. After possibly previewing the content, the user selects the content from the A source timeline 452 using two "select and scrub" gestures 432 to select the endpoints. The two select and scrub gestures 432 are shown by a select and scrub notation 471 and a select and scrub notation 472.

The selected content is then copied using the copy gesture 436, as shown by a copy notation 474. The copied content is pasted in the build sequence timeline 454 using a paste and scrub gesture 431, as shown by a paste and scrub notation 476.

FIG. 4 also shows a movement line 477 that serves two purposes. The first purpose is to indicate that the copied content item from the A source timeline 452 is the content that is pasted using the paste and scrub notation 476. The second purpose is to illustrate another implementation for pasting the content using a drag-and-drop operation. The drag-and-drop operation is further indicated a drag-and-drop notation 478.

In a third user sequencing operation, the user pastes pre-copied content into the live sequence timeline 451. The paste into the live sequence timeline 451 is performed using the paste and scrub gesture 431, as shown by a paste and scrub notation 481. The pasted content is still in the future, as indicated by a live pointer mark 464 on the live sequence timeline 451.

In a fourth user sequencing operation, the user performs the select live gesture 435 on the window 404, as shown by a select live symbol notation 485. The "LIVE" sequence time line and content is replaced with the "B" sequence time line and content. Accordingly, the "LIVE" display (the window 406) will play what used to be in the "B" sequence time line 453 at the point at which a "select" mark was placed or at the beginning of the sequence if no select line/mark is specified.

A user of the remote tablet 304 can manipulate content offline while a video stream is still being viewed by an audience. This ability provides an uninterrupted media sequence for the viewing audience. An example follows.

In at least one implementation, a live football game is broadcast and recorded by the user's media recording device, such as, for example, a personal data recorder ("PDR"), also referred to as a personal video recorder ("PVR") or a digital video recorder ("DVR"). Simultaneously a drama is broadcast and the same media device is recording this presentation. Some time has passed since the beginning of the programs such that several minutes of the programs are recorded ahead on the recording media. This enables the user to remove portions of the content such as commercials and insert other content, such as, for example, the drama or other personal media materials such as a family trip to the park, in place of the removed portion. The host device (for example, the video processing unit 302) slightly delays the event, such as the football game, so that commercials can be navigated to and replaced with a second video sequence (for example, the movie drama sequence).

Alternatively, or additionally, the remote media pad or tablet is set up, in certain implementations, to cause play of the event to resume upon touch screen command. For example, the user is, in certain applications, part of the viewing audience. When commercials arise, the user determines whether the audience wants to view the commercials. If the audience does not want to view the commercials, then the user provides a touch screen command on the remote tablet 304, and the video processing unit 302 resumes play of the partially pre-recorded event.

In many of the above implementations, the content is cued up in the main video processing system and only the final graphical display plane is sent to the remote display tablet. This advantageously presents a low-bandwidth communication requirement.

Additionally, various implementations also have a low-bandwidth communication requirement from the remote tablet 304 to the video processing unit 302. This arises because, for example, the gesture information is low data rate as explained, for example, earlier.

Figure 5:
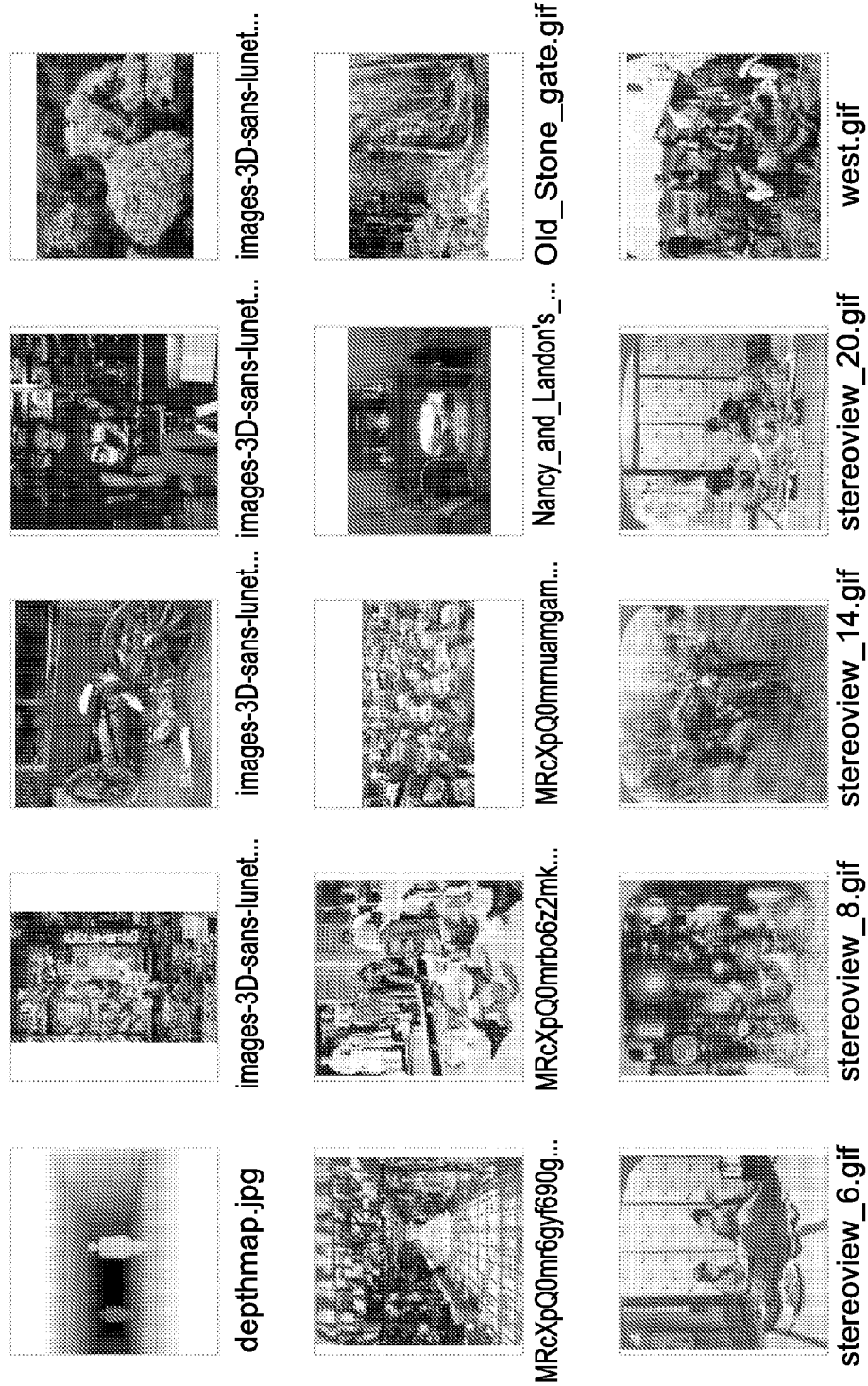
FIG. 5 is a pictorial representation of an implementation of various content sources.

Referring to FIG. 5, there is shown a selection of content that is available in one more implementations. The content of FIG. 5 is, in certain implementations, provided as thumbnails in the content selection section 410 of the display plane 400. The actual content depicted in FIG. 5 resides, in various implementations, on the video processing unit 302 and/or on remote storage devices including, for example, local PDRs or other locally networked storage drives, and/or Internet-accessed web sites (such as, for example, cloud-type storage devices). In one implementation, FIG. 5 represents the content on a thumb drive that is inserted into either the video processing unit 302 or the remote tablet 304. In another implementation, FIG. 5 represent the content that is available from a cell phone that communicates wirelessly (using, for example, a blue tooth connection) with the video processing unit 302.

It is important to note that typical implementations of the video processing unit 302 include a storage medium such as a hard drive that stores previously recorded programs as well as current live content. The video processing unit 302 of various implementations is additionally (i) network capable and/or (ii) connected to other sources of media such as, for example, memory sticks, additional hard drives, DVDs, Blu-ray discs, and/or "cloud" storage devices. Stored on this storage media is a variety of content, including, for example, (i) the user's content, (ii) content available from other sources such as, for example, a network File Transfer Protocol ("FTP") server's websites, (iii) shared content, (iv) commercially created content, and/or (v) live or delayed programming.

The system 300 in FIG. 3 also includes, as described above, wireless remote accessibility of the control of this editing device. That is, the remote tablet 304 is capable of wireless remote communication with the video processing unit 302, to edit a timeline. Wireless capability is provided, in various implementations, through means such as the Institute of Electrical and Electronics Engineers ("IEEE") standard 802.11. Actual edit queues are performed (for example, processing received gesture commands for creating a display sequence) in the video processing unit 302 main device (for example, the set top box Personal Video Recorder, PVR). Two or more video/audio streams (for example, from the content options 310) are transcoded to a lower bit rate for transmission and delivered to the remote table 304. The remote tablet 304 has a graphical user interface as shown, for example, in FIG. 4. The navigation through the material and the sequencing or queuing of content is accomplished with, for example, a "jog shuttle" (which is a type of manual interface) or a touch screen with editing gestures.

Media sources, such as a remote FTP server or a Blu ray disk, are implemented or instantiated into various implementations using a multi-windowed display plane. This can be shown, for example, by using the window 402 (described earlier as being used for content source A) of the display plane 400 as a window for content from a remote FTP server or from a Blu ray disk.

Transcoding of sequences from these sources is performed, as with other sources, and sent to the remote tablet 304 in a display plane. Transcoding refers generally to encoding in a manner that reduces the bit-rate of the source. In various implementations, the bit rate of the source content is reduced in at least two manners.

A first manner involves providing display planes to the remote table 304 at a frame rate lower than standard video frame rate and/or at a lower resolution bit rate to reduce transmission band width. For example, the video processing unit 302 of various implementations provides display planes at a rate of fifteen display planes per second. Thus, the video provided in the windows 402-408 is provided at a frame rate of only fifteen frames per second. This is lower than, for example, the more standard rate of thirty frames per second.

A second manner involves encoding the display planes to compress the data. The encoding uses, in certain implementations, lossy encoding that achieves significant bit reductions. One example of a lossy encoding mechanism is MPEG encoding.

In various other implementations, the video processing unit 302 transcodes sequences from the sources and sends the transcoded data to the remote tablet 304 without creating a display plane. Rather, the remote tablet 304 performs the assembly of the transcoded sequences into a display plane using the processing capabilities of the remote tablet 304.

In various implementations, media stream labels and video/audio cue pointer time stamp information are maintained by the video processing unit 302. This maintenance enables a presentation to jump from one media event to another in accordance with the program scripting that is generated by the gestures and timeline modification from the remote tablet 304.

Media insertion into a live program occurs, in various implementations, using devices such as DVD players and/or Blu-ray players. In various such implementations, disk time information is stored. The disk time information is used to establish the disk player play position and to achieve playback from defined points within the media content at the proper points in a presentation timeline. A Blu-ray player, in one implementation, is paused by the video processing unit 302 at the point of edit insertion so that, when the edit point occurs, a seamless transition to the disk play can occur. Control of the disk player is accomplished, in various implementations, wirelessly through infra-red (IR), wirelessly through radio frequencies (RF), or by wired control.

In at least one embodiment, the only information passed to the remote tablet 304 is the transcoded display plane and metadata. The metadata includes only the program name and time stamp information of the individual media content represented in the time lines and display windows.

Note that typical implementations of the system 300 encode and transmit display planes in their entirety. Thus, to provide an updated display plane to the remote tablet 304, the video processing unit 302 creates, encodes, and transmits an entire display plane. Often, the updated display plane only differs in the content of a single window, for example. Various implementations use MPEG, or other differential encoding, to encode the display plane in a manner that focuses bits on the portions of the updated display plane that differ.

Various of the embodiments described above are related to a remote second screen tablet function (for example, the remote tablet 304) for cueing main viewing screen content (for example, the content provided by the live display frame builder 330). During a period of time during which several people are participating in a media viewing event, such as a football game, the host or master of content may wish to change the program being viewed. The change in program viewing may be due to a commercial airing in the broadcast, or it may be due to a user wishing to insert content, such as pictures from a recent trip to Paris. Content may be delivered or uploaded by connecting the media to the video processing unit wirelessly by means such as 802.11, Bluetooth, Radio Frequency for Consumer Electronics (RF4 CE), Zigbee, or via thumb drive. The host user or client uses the remote tablet device to cue content and enable sequenced play of that content when the next commercial begins or alternately timed with a user's desired or identified triggering event (for example, at halftime of a football game).

It should also be clear that, in several implementations, the remote media tablet or pad provides for a browsing device that finds the files of content on the host user system and loads them into the time line of the display sequence. The browsing device of various implementations searches for content on, for example, the internet, various media channels (for example, satellite or cable), prerecorded content, live content, Blu-ray media, and/or DVD media. If individual pictures are selected, a slideshow presentation option may be selected. If a video sequence is selected, it is queued to start in time with the football game commercial by slightly prerecording and effectively time shifting the game. The remote tablet utilizes hand gestures to select content and build cueing events.

Various implementations of the system described above effectively give the host a processing ability similar to that of a disk jockey or video editor/presenter. Through the method of queuing media and the displaying of content on the remote tablet viewer, various embodiments allow an operator or content owner to sequence and present multiple programs and substitute their content in place of the commercial sequences of the game or event being displayed.

Various embodiments further allow live display of the game's commercials to the host, as previously described, for example, with respect to the select live gesture 435. This allows the host, for example, to play different content instead of the commercial, and to know when the commercial has ended so that the game can be resumed.

In a related implementation, the user (host) "blacks out" the commercials. The user also, in certain applications, provides a music overlay during the commercials. This is performed, for example, by performing two operations when the commercial beings. One of the operations is to perform the select live gesture 435 on the music content when the commercial begins. The other of the two operations is to perform a "video mute" operation on the live sequence timeline 451 when the commercial begins. A video mute operation blacks out the video. The video mute operation is implemented, in various embodiments, using, for example, a gesture (not shown) or a button (not shown).

In the above implementation, the user also, in certain scenarios determines that the blacked-out commercial is of interest to the audience. In such a scenario, the user has the ability to sequence the commercial to be played later in the live sequence timeline 451.

In various implementations, media content is placed in a PIP format, in which the content is in a smaller window of the main display for the viewing audience. A window of the display plane is, in certain implementations, configured to allow PIP displays we well, and/or to indicate where the PIP is located on the live display.

In yet a further implementation, a gesture or button for a partial video mute is provided. The partial video mute blacks out a portion of the video screen, leaving a small portion visible so that it relatively easy for the user or the audience to see when a commercial has ended. In various implementations, the portion of the video screen that is blacked out can be set, and changed, by the user.

In an alternate embodiment, bit streams are sent to the remote tablet 304 for processing, rather than performing the processing in the video processing unit 302. In one such implementation, a transcoder in the video processing unit 302 transcodes content stored on, for example, a hard drive. The content is transcoded to a data stream having a simpler video signal format. Time code markings are also transcoded. These reduced bit-rate streams and associated markings are sent to the remote tablet 304. The remote tablet 304 has an interactive ability to scroll through the received content. This implementation has a low transfer rate and a low bandwidth because all that transfers to the remote tablet 304 is the transcoded video and time stamp information of the current frame.

Various embodiments described in this application provide for cueing, altering, and transferring video content for display on a video display system. The embodiments include a second device used as a remote processing tablet, allowing a pre-viewing and sequencing of content prior to display on the video display. Live content may be time delayed using a storage medium, such as a hard drive, in order to allow for cueing. Content from multiple additional sources may be interleaved for display on a main display. The embodiments include the use of pointers into time delayed live content and/or user pre-recorded content. The host display plane is constructed in a video processing unit as part of a main processing device (for example, a set-top box, a gateway, a router). This allows only the changing graphics to be sent digitally to the remote processing tablet for cueing. Hand gestures are used to cue and control content on the remote tablet. These hand gestures are digitized and sent back to the video processing unit to enable processing (for example, editing, altering, interleaving) of the combined video sequence.

Figure 6:
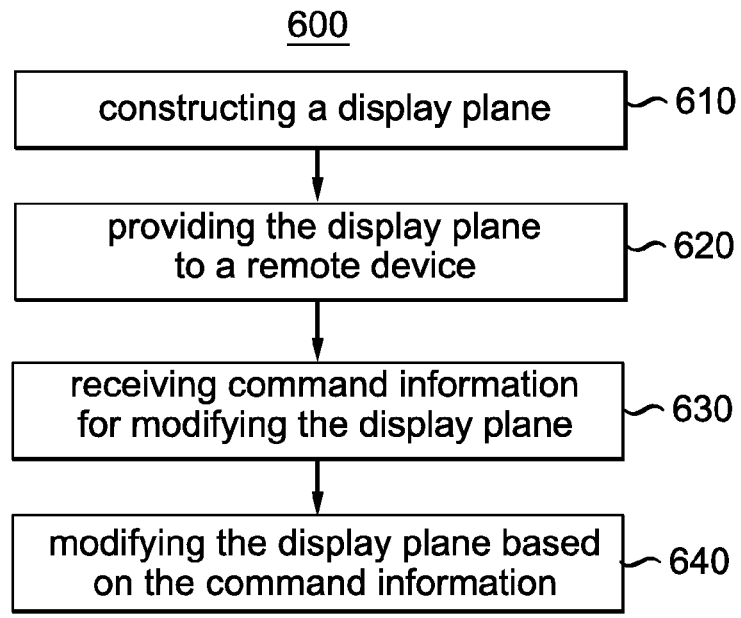
FIG. 6 is a block/flow diagram depicting an implementation of a first content management process and apparatus.

Referring to FIG. 6, a process 600 is provided. The process 600 includes constructing a display plane (610). This is performed, in various implementations, for example, by the video processing unit 302 as described in this application.

In various implementations, the display plane includes a first content source window indicating content from a first content source, and a timeline for sequencing the first content source into a presentation for a presentation device. In additional implementations, the display plane further includes a second content source window indicating content from a second content source, and the timeline is for sequencing the first content source and the second content source into the presentation for the presentation device.

In various implementations, the first content source window indicates content from the first content source by showing an indication of the content that has been selected as the first content source. Such an indication is, for example, an icon. Such indications need not present the actual content of the first content source. In various such implementations, the actual content is not presented. In various other such implementations, the actual content is presented on an alternate presentation device, such as, for example, a picture-in-a-picture of a main display that is presenting the presentation.

In various implementations, the first content source window indicates content from the first content source by presenting the content in the first content source window. The first content source window presents video content from the first content source by, for example, displaying the video content in the first content source window. The first content source window presents audio content from the first content source by, for example, displaying an amplitude graph of the audio in the first content source window as the audio is played.

The process 600 includes providing the display plane to a remote device (620). This is performed, in various implementations, for example, by the video processing unit 302 sending the display plane to the remote tablet 304, as described in this application.

The process 600 includes receiving command information for modifying the display plane (630). This is performed, in various implementations, for example, by the video processing unit 302 receiving from the remote tablet 304 a gesture identifier and a gesture location, as described in this application.

The process 600 includes modifying the display plane based on the command information (640). This is performed, in various implementations, for example, by the video processing unit 302 modifying the display plane 400 in response to the gesture identifier and gesture location received from the remote tablet 304, as described in this application.

In various implementations, modifying the display plane includes modifying the first content source window so that the first content source window indicates content from a second content source that is different from the first content source. Modifying the display plane also includes, for example, moving content around in the timeline.

Figure 7:
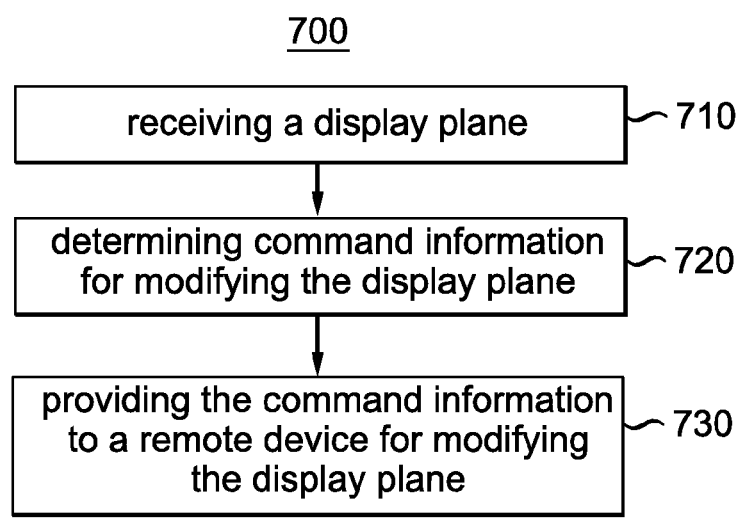
FIG. 7 is a block/flow diagram depicting an implementation of a second content management process and apparatus.

Referring to FIG. 7, a process 700 is provided. The process 700 includes receiving a display plane (710). This is performed, in various implementations, for example, by the remote tablet 304 receiving the display plane 400 from the video processing unit 302, as described in this application.

The process 700 includes determining command information for modifying the display plane (720). This is performed, in various implementations, for example, by the control block 360 of the remote tablet 304 determining (i) a gesture based on input received from the touch screen 370, and (ii) determining, for the gesture, a gesture identifier and a gesture location, as described in this application.

The process 700 includes providing the command information to a remote device for modifying the display plane (730). This is performed, in various implementations, for example, by the remote tablet 304 sending the gesture identifier and the gesture location to the video processing unit 302, as described in this application. Sending the command information allows the video processing unit 302 to modify the display plane 400, as described in this application.

Figure 8:
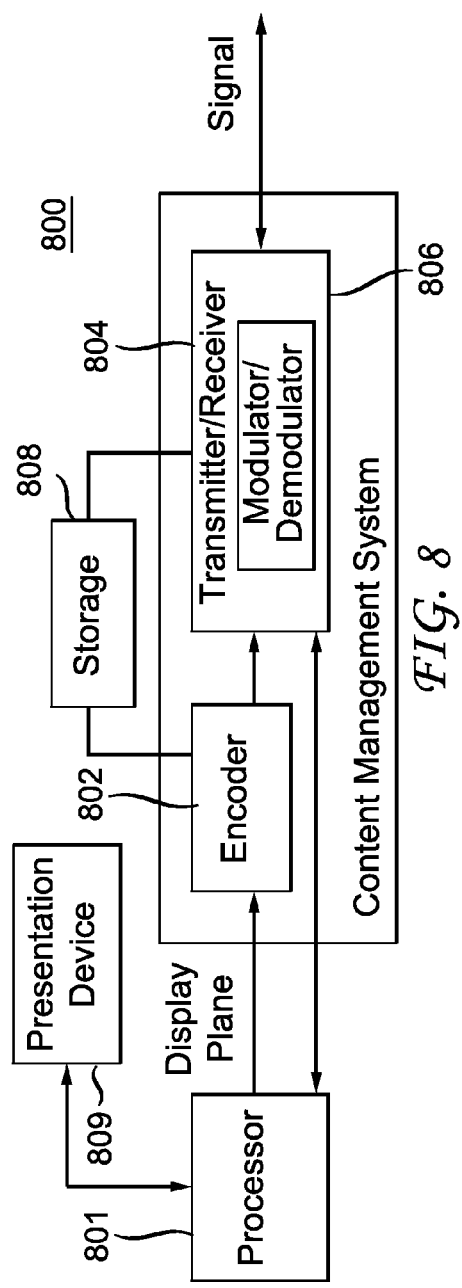
FIG. 8 is a block/flow diagram depicting an implementation of a content management system and process.

Referring now to FIG. 8, a content management system or apparatus 800 is shown, to which the features and principles described above may be applied. The content management system or apparatus 800 may be, for example, a system for transmitting a signal using any of a variety of media, such as, for example, satellite, cable, telephone-line, terrestrial broadcast, infra-red, or radio frequency. The content management system or apparatus 800 also, or alternatively, may be used, for example, to provide a signal for storage. The transmission may be provided, for example, over the Internet or some other network, or line of sight. The content management system or apparatus 800 is capable of generating and delivering, for example, video content and other content, for use in, for example, cueing content for a presentation. It should also be clear that the blocks of FIG. 8 provide a flow diagram of a content management process, in addition to providing a block diagram of a content management system or apparatus.

The content management system or apparatus 800 receives a display plane from a processor 801. In one implementation, the processor 801 is part of the content management system or apparatus 800. In various implementations, the processor 801 is configured for performing the process 600.

The content management system or apparatus 800 includes an encoder 802 and a transmitter/receiver 804 capable of transmitting the encoded signal. The encoder 802 receives the display plane from the processor 801. The encoder 802 generates an encoded signal(s) based on the display plane and, in certain implementations, metadata information. The encoder 802 may be, for example, an AVC encoder. The AVC encoder may be applied to both video and other information.

The encoder 802 may include sub-modules, including for example an assembly unit for receiving and assembling various pieces of information into a structured format for storage or transmission. The various pieces of information may include, for example, coded or uncoded video, and coded or uncoded elements such as, for example, motion vectors, coding mode indicators, and syntax elements. In some implementations, the encoder 802 includes the processor 801 and therefore performs the operations of the processor 801.

The transmitter/receiver 804 receives the encoded signal(s) from the encoder 802 and transmits the encoded signal(s) in one or more output signals. Typical transmitters perform functions such as, for example, one or more of providing error-correction coding, interleaving the data in the signal, randomizing the energy in the signal, and modulating the signal onto one or more carriers using a modulator/demodulator 806. The transmitter/receiver 804 may include, or interface with, an antenna (not shown). Further, implementations of the transmitter/receiver 804 may be limited to the modulator/demodulator 806.

The content management system or apparatus 800 is also communicatively coupled to a storage unit 808. In one implementation, the storage unit 808 is coupled to the encoder 802, and is the storage unit 808 stores an encoded bitstream from the encoder 802. In another implementation, the storage unit 808 is coupled to the transmitter/receiver 804, and stores a bitstream from the transmitter/receiver 804. The bitstream from the transmitter/receiver 804 may include, for example, one or more encoded bitstreams that have been further processed by the transmitter/receiver 804. The storage unit 808 is, in different implementations, one or more of a standard DVD, a Blu-Ray disc, a hard drive, or some other storage device.

The content management system or apparatus 800 is also communicatively coupled to a presentation device 809, such as, for example, a television, a computer, a laptop, a tablet, or a cell phone. The processor 801 provides an input to the presentation device 809. The input typically includes a sequence of content intended for presentation to an audience.

Figure 9:
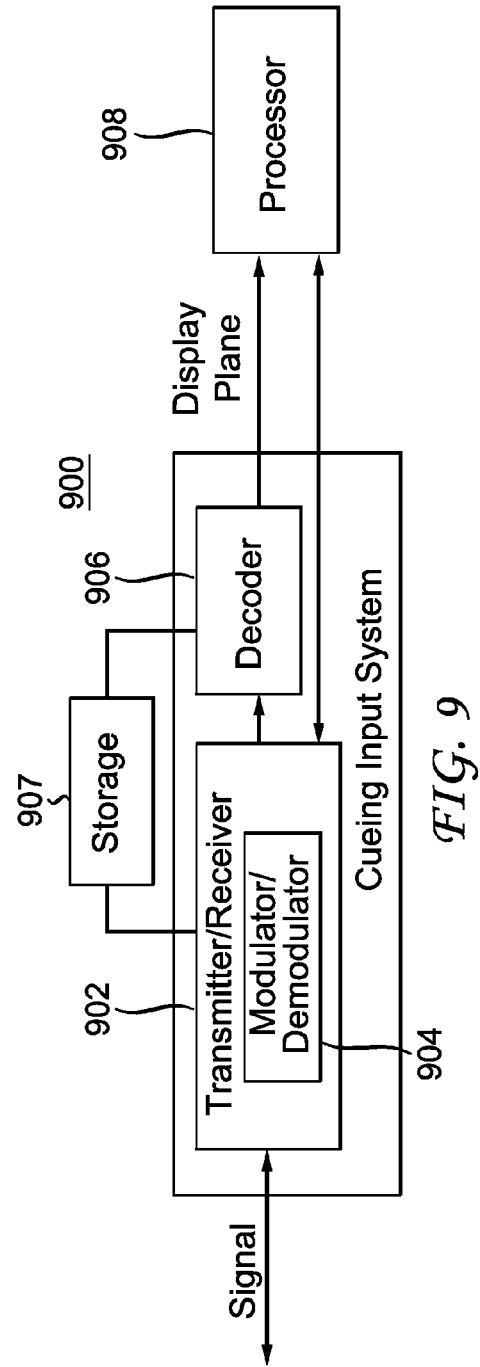
FIG. 9 is a block/flow diagram depicting an implementation of a content management system and process.

Referring now to FIG. 9, a content management system or apparatus 900 is shown to which the features and principles described above may be applied. The content management system or apparatus 900 may be configured to receive signals over a variety of media, such as, for example, satellite, cable, telephone-line, terrestrial broadcast, infra-red, or radio frequency. The signals may be received, for example, over the Internet or some other network, or by line-of-sight. It should also be clear that the blocks of FIG. 9 provide a flow diagram of a content management process, in addition to providing a block diagram of a content management system or apparatus.

The content management system or apparatus 900 may be, for example, a cell-phone, a computer, a tablet, a set-top box, a television, a gateway, a router, or other device that receives encoded content and provides cueing input.

The content management system or apparatus 900 is capable of receiving and processing content information, and the content information may include, for example, a display plane, video images, and/or metadata. The content management system or apparatus 900 includes a transmitter/receiver 902 for receiving an encoded signal, such as, for example, the signals described in the implementations of this application. The transmitter/receiver 902 receives, in various implementations, for example, a signal providing one or more of a signal output from the content management system 800 of FIG. 8, or a signal providing a transmission of a picture output from the video processing unit 302.

Typical receivers perform functions such as, for example, one or more of receiving a modulated and encoded data signal, demodulating the data signal from one or more carriers using a modulator/demodulator 904, de-randomizing the energy in the signal, de-interleaving the data in the signal, and error-correction decoding the signal. The transmitter/receiver 902 may include, or interface with, an antenna (not shown). Implementations of the transmitter/receiver 902 may be limited to the modulator/demodulator 904.

The content management system or apparatus 900 includes a decoder 906. The transmitter/receiver 902 provides a received signal to the decoder 906.

The signal provided to the decoder 906 by the transmitter/receiver 902 may include one or more encoded bitstreams. The decoder 906 outputs a decoded signal, such as, for example, a decoded display plane. The decoder 906 is, in various implementations, for example, an AVC decoder.

The content management system or apparatus 900 is also communicatively coupled to a storage unit 907. In one implementation, the storage unit 907 is coupled to the transmitter/receiver 902, and the transmitter/receiver 902 accesses a bitstream from the storage unit 907. In another implementation, the storage unit 907 is coupled to the decoder 906, and the decoder 906 accesses a bitstream from the storage unit 907. The bitstream accessed from the storage unit 907 includes, in different implementations, one or more encoded bitstreams. The storage unit 907 is, in different implementations, one or more of a standard DVD, a Blu-Ray disc, a hard drive, or some other storage device.

The output video from the decoder 906 is provided, in one implementation, to a processor 908. The processor 908 is, in one implementation, a processor configured for performing, for example, all or part of the process 700. One such implementation, the processor 908 is the control block 360. In another implementation, the processor 908 is configured for performing one or more post-processing operations.

In some implementations, the decoder 906 includes the processor 908 and therefore performs the operations of the processor 908. In other implementations, the processor 908 is part of a downstream device such as, for example, a set-top box, a tablet, a router, or a television. More generally, the processor 908 and/or the content management system or apparatus 900 are, in various implementations, part of a gateway, a router, a set-top box, a tablet, a television, or a computer.

The content management system or apparatus 900 is also configured to receive input from a user or other input source. The input is received, in typical implementations, by the processor 908 using a mechanism not explicitly shown in FIG. 9. The input mechanism includes, in various implementations, a touch screen, a mouse, or a microphone. In at least one implementation, the input includes cueing instructions.

The content management system or apparatus 900 is also configured to provide the input, such as, for example, cueing instructions to a remote device. The input is, for example, modulated using the modulator/demodulator 904 and transmitted using the transmitter/receiver 902.

Referring again to FIG. 8, the content management system or apparatus 800 is further configured to receive input, such as, for example, cueing input. The input is received by the transmitter/receiver 806, and provided to the processor 801. In various implementations, the processor 801 uses the input to modify the display plane, and the modified display plane is transmitted from the content management system or apparatus 800.

Referring again to FIG. 3, the operations performed by the video processing unit 302, including the operations performed by the live display fame builder 330, the tablet simulation frame builder 340, the encoder 344, and the control block 320, are, in various implementations, performed by a single processor, or by multiple processors. Similarly, the operations performed by the remote tablet 304, including the operations performed by the control block 360 and the decoder 365, are, in various implementations, performed by a single processor, or by multiple processors.

Referring still to FIG. 3, the remote tablet 304 and the video processing unit 302 are shown with the ability to digitally communicate. In particular implementations, the communications uses IEEE 802.11n. Using IEEE 802.11n, or other means of communication, additional implementations allow a USB drive to be plugged into the remote tablet 304. The remote tablet 304 is able to access content stored on the USB drive and digitally transfer that content or otherwise make that content available to the video processing unit 302 as an additional media source. In this manner, such implementations provide a simple mechanism for a user that is operating the remote tablet 304 to add content sources to the system 300.

Various of the above implementations are also presumed to include audio. Certain implementations accommodate audio by including additional features. One such feature is to provide separate audio and video pointers for each of the live pointer and the live source cue pointer. Thus, for example, in one implementation, the live display frame builder 330 uses both a live video pointer and a live audio pointer, and the tablet simulation frame builder 340 uses both a live video source cue pointer and a live audio source cue pointer. The audio pointers often point to the same source as the video pointers because the audio that corresponds to the video is often of interest. For example, when viewing a football game, the audience will often want to hear what the game announcers are saying. However, in other applications, the user will want to include audio content from the music content 313 while displaying pictures from the photo content 312. In yet other applications, the user will switch to a separate audio source such as, for example, a radio or internet announcer. Various implementations also provide a delay feature, to delay audio and/or video, in order to achieve synchronization between the video and the audio.

Further, in various applications, the user will want to replace the audio that corresponds to the video. For example, the user may want to include a song as the audio (from the music content 313) while viewing a home video. In yet other applications, the user may want to mix or fade audio from various sources, such as, for example, fading a song in and out of the home video.

To support various audio features, certain implementations provide a gesture for overlaying audio onto the build sequence timeline 454 (or any other timeline, for example). Overlaying audio replaces only the audio portion of the content on the relevant portion of the build sequence timeline 454. In one scenario, the user (i) inserts a home video into the build sequence timeline 454, (ii) copies an audio source from the content selection section 410, (iii) pastes the copied audio into, for example, the A source timeline 452, and previews the copied audio, (iv) copies and pastes a portion of that audio into the build sequence timeline 454 as an overlay audio for the home video. The last operation of inserting the overlay audio uses the overlay audio gesture.

Various implementations also provide a simplified process for replacing commercials in video source, such as, for example, a football game. A user selects a video source as the primary presentation, and initiates the process.

The process queries the user for selection of a second source as the fill for the commercials, or the user can pre-identify this source. The process then automatically identifies the commercials in the primary presentation and fills them with successive portions of the fill source. The process copies the modified sequence into the live sequence timeline 451, and periodically repeats the process for subsequent portions of the primary presentation as the primary presentation is made available. The primary presentation may be made available in increments because, for example, (i) the primary presentation is being broadcast live and only fifteen minutes is being buffered and pre-recorded on a PDR prior to presentation to the audience, or (ii) the buffering capability of the content cueing system 300 is limited.

Various implementations also operate without using a touch screen. Certain of these implementations capture a user's gestures using an alternate technology, such as, for example, a camera. Other implementations capture a user's commands using, for example, voice recognition technology and/or by tracking eye movement.

Various implementations also operate without transmitting and receiving a display plane. For example, certain implementations use a variation of the video processing unit 302 to send content information without sending an actual display plane. Such implementations typically use metadata to indicate a timeline and the content.

Various implementations operate with considerable distance between the video processing unit 302 and the remote tablet 304. In several such implementations, communication between the video processing unit 302 and the remote tablet 304 occurs using a combination of broadcast, cable, and/or satellite links. Certain implementations use the internet and/or internet-based services to send and receive display planes and metadata, including encoded gesture information. One particular implementation sends and receives display planes and metadata using a Skype call.

Many of the implementations in this application are based, at least in part, on video content. However, other implementations and applications present non-video content to an audience. Such non-video content includes, for example, audio, motion, scent, or other stimuli. For example, in one implementation, an audience is assembled in mechanized seating, and the user includes in the sequence a set of instructions that provide a scripted sequence of motions. In various applications, the user also overlays instructions for providing a various scents and smells using appropriate scent machines included in the mechanized seating. Clearly, various implementations need not provide, for example, video, and may provide any combination of content.

Various implementations refer to a timeline. Examples include the live sequence timeline 451, the A source timeline 452, the B source timeline 453, and the build sequence timeline 454. It should be clear that a timeline in such implementations is a mechanism that presents timing information for one or more pieces of content. As such, other implementations present different pieces of timing information in a timeline. Additionally, other implementations use a variety of different representations to portray a timeline. One such implementation uses a tabular representation to indicate key timing events for a piece of content. Metadata in one such implementation includes (i) the program title (either the actual title or a content description such as, for example, a channel name or a file name), (ii) the audio/video program counter value(s) as defined, for example, by the system clock reference time stamp or the SMPTE time coding, and (iii) the overall length of the program.

Various implementations operate on video content. Such content includes, in various implementations, one or more of broadcast content, internet-delivered content, pre-recorded DVD content, Blu-ray portable content, USB and/or Bluetooth portable device content, and/or Skype video phone call content.

It is noted that some implementations have particular advantages, or disadvantages. However, a discussion of the disadvantages of an implementation does not eliminate the advantages of that implementation, nor indicate that the implementation is not a viable and even recommended implementation.

Various implementations generate or process signals and/or signal structures. Such signals are formed, in certain implementations, using pseudo-code or syntax. Signals are produced, in various implementations, at the outputs of the video processing unit 302, the remote tablet 304, the processor 801, the encoder 802, the transmitter/receiver 804, the transmitter/receiver 902, the decoder 906, or the processor 908. The signal and/or the signal structure is transmitted and/or stored (for example, on a processor-readable medium) in various implementations.

This application provides multiple block/flow diagrams, including the block/flow diagrams of FIGS. 1, 3, and 6-9. It should be clear that the block/flow diagrams of this application present both a flow diagram describing a process, and a block diagram describing functional blocks of an apparatus, device, or system. Further, the block/flow diagrams illustrate relationships among the components and outputs of the components. Additionally, this application provides multiple pictorial representations, including the pictorial representations of FIGS. 2 and 4-5. It should be clear that the pictorial representations of at least FIGS. 2 and 4 present both a visual representation of a device or screen, as well as a process for interacting with the device or screen.

Additionally, many of the operations, blocks, inputs, or outputs of the implementations described in this application are optional, even if not explicitly stated in the descriptions and discussions of these implementations. For example, many of the operations discussed with respect to FIGS. 3-4 can be omitted in various implementations. The mere recitation of a feature in a particular implementation does not indicate that the feature is mandatory for all implementations. Indeed, the opposite conclusion should generally be the default, and all features are considered optional unless such a feature is stated to be required. Even if a feature is stated to be required, that requirement is intended to apply only to that specific implementation, and other implementations are assumed to be free from such a requirement.

We thus provide one or more implementations having particular features and aspects. In particular, we provide several implementations relating to sequencing content for presentation to an audience. Sequencing content, as described in various implementations in this application, can be used in a variety of environments, including, for example, entertaining friends in the home, collaborating with colleagues at work, or presenting material to a board of directors. Further, the audience and the content-controller (referred to as the user, or operator of the remote tablet 304, in several discussions in this application) are, in different implementations, in the same room, in different rooms of the same building, or separated by large distances. In one large-distance implementation, the user is in Paris and the audience is in New York. Additionally, in various implementations, the user is not sequencing content for an ongoing presentation. Rather, the sequenced content is stored for later presentation, or for storage and distribution on a recordable medium. Additional variations of these implementations and additional applications are contemplated and within our disclosure, and features and aspects of described implementations may be adapted for other implementations.

Several of the implementations and features described in this application may be used in the context of the AVC Standard, and/or AVC with the MVC extension (Annex H), and/or AVC with the SVC extension (Annex G). AVC refers to the existing International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (referred to in this application as the "H.264/MPEG-4 AVC Standard" or variations thereof, such as the "AVC standard", the "H.264 standard", "H.264/AVC", or simply "AVC" or "H.264"). Additionally, these implementations and features may be used in the context of another standard (existing or future), or in a context that does not involve a standard.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, evaluating the information, predicting the information, or retrieving the information from memory.

Further, this application or its claims may refer to "accessing" various pieces of information. Accessing the information may include one or more of, for example, receiving the information, retrieving the information (for example, memory), storing the information, processing the information, transmitting the information, moving the information, copying the information, erasing the information, calculating the information, determining the information, predicting the information, evaluating the information, or estimating the information.

Various implementations use multiple camera angle media feeds. Such an environment is found, for example, in the media production of a sporting event. The multiple camera angle media feeds are, in one application, assigned to different timelines, and sequenced to provide the desired viewing experience.

This application or its claims may refer to "providing" information from a first device (or location) to a second device (or location). This application or its claims may also, or alternatively, refer to "receiving" information from the second device (or location) at the first device (or location). Such "providing" or "receiving" is understood to include, at least, direct and indirect connections. Thus, intermediaries between the first and second devices (or locations) are contemplated and within the scope of the terms "providing" and "receiving". For example, if the information is provided from the first location to an intermediary location, and then provided from the intermediary location to the second location, then the information has been provided from the first location to the second location. Similarly, if the information is received at an intermediary location from the first location, and then received at the second location from the intermediary location, then the information has been received from the first location at the second location.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Various implementations refer to "images" and/or "pictures". The terms "image" and "picture" are used interchangeably throughout this document, and are intended to be broad terms. An "image" or a "picture" may be, for example, all or part of a frame or of a field. The term "video" refers to a sequence of images (or pictures). An image, or a picture, may include, for example, any of various video components or their combinations. Such components, or their combinations, include, for example, luminance, chrominance, Y (of YUV or YCbCr or YPbPr), U (of YUV), V (of YUV), Cb (of YCbCr), Cr (of YCbCr), Pb (of YPbPr), Pr (of YPbPr), red (of RGB), green (of RGB), blue (of RGB), S-Video, and negatives or positives of any of these components. An "image" or a "picture" may also, or alternatively, refer to various different types of content, including, for example, typical two-dimensional video, a disparity map for a 2D video picture, a depth map that corresponds to a 2D video picture, or an edge map.

Further, many implementations may refer to a "frame". However, such implementations are assumed to be equally applicable to a "picture" or "image".

A "depth map", or "disparity map", or "edge map", or similar terms are also intended to be broad terms. A map generally refers, for example, to a picture that includes a particular type of information. However, a map may include other types of information not indicated by its name. For example, a depth map typically includes depth information, but may also include other information such as, for example, video or edge information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C" and "at least one of A, B, or C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Additionally, many implementations may be implemented in one or more of an encoder (for example, the encoder 802), a decoder (for example, the decoder 906), a post-processor (for example, the processor 908) processing output from a decoder, or a pre-processor (for example, the processor 801) providing input to an encoder.

The processors discussed in this application do, in various implementations, include multiple processors (sub-processors) that are collectively configured to perform, for example, a process, a function, or an operation. For example, the processor 801 and the processor 908 are each, in various implementations, composed of multiple sub-processors that are collectively configured to perform the operations of the respective processors 801 and 908. Further, other implementations are contemplated by this disclosure.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a set-top box, a gateway, a router, a microprocessor, an integrated circuit, or a programmable logic device. Processors also include communication devices, such as, for example, computers, cell phones, portable/personal digital assistants ("PDAs"), tablets, laptops, and other devices that facilitate communication of information between end-users. A processor may also include multiple processors that are collectively configured to perform, for example, a process, a function, or an operation. The collective configuration and performance may be achieved using any of a variety of techniques known in the art, such as, for example, use of dedicated sub-processors for particular tasks, or use of parallel processing.

Implementations of the various processes and features described herein may be embodied in a variety of different equipment or applications, particularly, for example, equipment or applications associated with data encoding, data decoding, program or content sequencing, and other processing of images or other content. Examples of such equipment include a processor, an encoder, a decoder, a post-processor processing output from a decoder, a pre-processor providing input to an encoder, a video coder, a video decoder, a video codec, a web server, a set-top box, a laptop, a personal computer, a tablet, a router, a cell phone, a PDA, and other communication devices. As should be clear, the equipment may be mobile and even installed in a mobile vehicle.

Additionally, the methods may be implemented by instructions being performed by a processor (or by multiple processors collectively configured to perform such instructions), and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the encoded display plane 400, or the encoded gesture identifier and gesture location, as discussed with respect to FIGS. 3-4. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:
1. A method comprising:
receiving a display plane, the display plane including a first content source window indicating content from a first content source, and a timeline that indicates particular content that is scheduled to be presented on a presentation device, the timeline allowing for sequencing the first content source into a presentation for the presentation device;
determining command information for modifying the timeline to include content from the first content source while still retaining some of the particular content in the timeline;
encoding the command information into a low bit rate format compared to the content; and providing the encoded command information to a remote device for modifying the display plane,
wherein a portable device performs the receiving, the determining, the encoding, and the providing, and the portable device relies on the remote device to modify the display plane using the encoded command information and to produce the sequenced presentation for the presentation device.

2. The method of claim 1 wherein the received display plane comprises an encoded display plane.

3. The method of claim 1 wherein the content from the first content source is received in a format that is compressed compared to a format suitable for the presentation.

4. The method of claim 1 wherein the command information for modifying the display plane comprises command information to change the presentation.

5. The method of claim 1 wherein determining command information for modifying the display plane comprises determining command information for modifying the timeline.

6. The method of claim 1 further comprising:
receiving an encoding of a modified display plane, the modified display plane having been modified by the remote device based on the provided command information.

7. The method of claim 1 wherein:
the command information comprises an indicator of a gesture for modifying the display plane, and includes coordinate information indicating coordinates of the gesture.

8. The method of claim 7 wherein:
the coordinates of the gesture indicate a point of contact of the gesture, and
the command information further comprises a direction of movement of the gesture, a speed of movement of the gesture, and a duration of contact of the gesture.

9. The method of claim 1 wherein determining command information is performed in response to receiving a command from a user.

10. The method of claim 9 wherein the received command comprises a gesture.

11. The method of claim 1 wherein receiving the display plane comprises receiving the display plane over a wireless transmission medium from the remote device to the portable device performing the determining of the command information.

12. The method of claim 1 wherein providing the command information comprises transmitting the command information over a wireless transmission medium to the remote device from the portable device performing the determining of the command information.

13. An apparatus comprising:
a portable device comprising one or more processors collectively configured to provide:
means for receiving a display plane, the display plane including a first content source window indicating content from a first content source, and a timeline that indicates particular content that is scheduled to be presented on a presentation device, the timeline allowing for sequencing the first content source into a presentation for the presentation device;
means for determining command information for modifying the timeline to include content from the first content source while still retaining some of the particular content in the timeline;
means for encoding the command information into a low bit rate format compared to the content; and
means for providing the encoded command information to a remote device for modifying the display plane,
wherein the portable device performs the receiving, the determining, the encoding, and the providing, and the portable device relies on the remote device to modify the display plane using the encoded command information and to produce the sequenced presentation for the presentation device.

14. An apparatus comprising:
one or more processors collectively configured for:
receiving a display plane, the display plane including a first content source window indicating content from a first content source, and a timeline that indicates particular content that is scheduled to be presented on a presentation device, the timeline allowing for sequencing the first content source into a presentation for the presentation device;
determining command information for modifying the timeline to include content from the first content source while still retaining some of the particular content in the timeline;
encoding the command information into a low bit rate format compared to the content; and
providing the encoded command information to a remote device for modifying the display plane,
wherein a portable device performs the receiving, the determining, the encoding, and the providing, and the portable device relies on the remote device to modify the display plane using the encoded command information and to produce the sequenced presentation for the presentation device.

15. The apparatus of claim 14 wherein the apparatus comprises one or more of an encoder, a decoder, a modulator, a demodulator, a receiver, a set-top box, a gateway, a router, a tablet, a remote control, a laptop, or a processor.

16. The apparatus of claim 14 further comprising one or more of:
a modulator configured for modulating a signal with data indicating the command information, or
a demodulator configured for demodulating a signal with data indicating the display plane.

17. A non-transitory processor readable storage medium having stored thereon instructions for causing one or more processors to collectively perform at least the following:
receiving a display plane, the display plane including a first content source window indicating content from a first content source, and a timeline that indicates particular content that is scheduled to be presented on a presentation device, the timeline allowing for sequencing the first content source into a presentation for the presentation device;
determining command information for modifying the timeline to include content from the first content source while still retaining some of the particular content in the timeline;
encoding the command information into a low bit rate format compared to the content; and
providing the encoded command information for transmission to a remote device for modifying the display plane,
wherein a portable device performs the receiving, the determining, the encoding, and the providing, and the portable device relies on the remote device to modify the display plane using the encoded command information and to produce the sequenced presentation for the presentation device.

* * * * *